United States Patent [19]

Rocha

[11] Patent Number: 5,133,582
[45] Date of Patent: Jul. 28, 1992

[54] TWO-HANDED SHOVEL

[76] Inventor: Louis F. Rocha, 91 Highland St., Taunton, Mass. 02780

[21] Appl. No.: 766,515

[22] Filed: Sep. 27, 1991

[51] Int. Cl.$^5$ .......................... A01B 1/22; B25G 3/38
[52] U.S. Cl. ................................... 294/58; 294/54.5
[58] Field of Search ............... 294/54.5, 57–59; 15/143 R, 144 R, 144 A, 145; 16/111 R, 112, 114 R, DIG. 24, DIG. 25; 37/265, 285; 254/131.5; 403/53, 57, 58

[56] References Cited

U.S. PATENT DOCUMENTS

| | | | |
|---|---|---|---|
| 933,647 | 9/1909 | Hunt | 294/58 |
| 4,050,728 | 9/1977 | Davidson | 294/58 |
| 4,200,324 | 4/1980 | Helton | 294/58 |
| 4,264,096 | 4/1981 | Barnett | 294/58 |
| 4,615,553 | 10/1986 | Hultine | 294/58 |
| 4,881,332 | 11/1989 | Evertsen | 294/54.5 X |
| 4,944,541 | 7/1990 | Waldschmidt | 294/58 |
| 5,054,830 | 10/1991 | Nisenbaum | 294/58 |

*Primary Examiner*—Johnny D. Cherry
*Attorney, Agent, or Firm*—Robert J. Doherty

[57] ABSTRACT

A two-handled shovel in which the shorter shaft of the secondary or lift handle is connected at its lower terminal end to the primary handle at a point proximal its connection with the blade through a connection which enables essentially unlimited rotary direction of the primary handle with respect to the secondary handle during operation. Normally such attachment mechanism is accomplished by the provision of a rotary bushing.

9 Claims, 3 Drawing Sheets

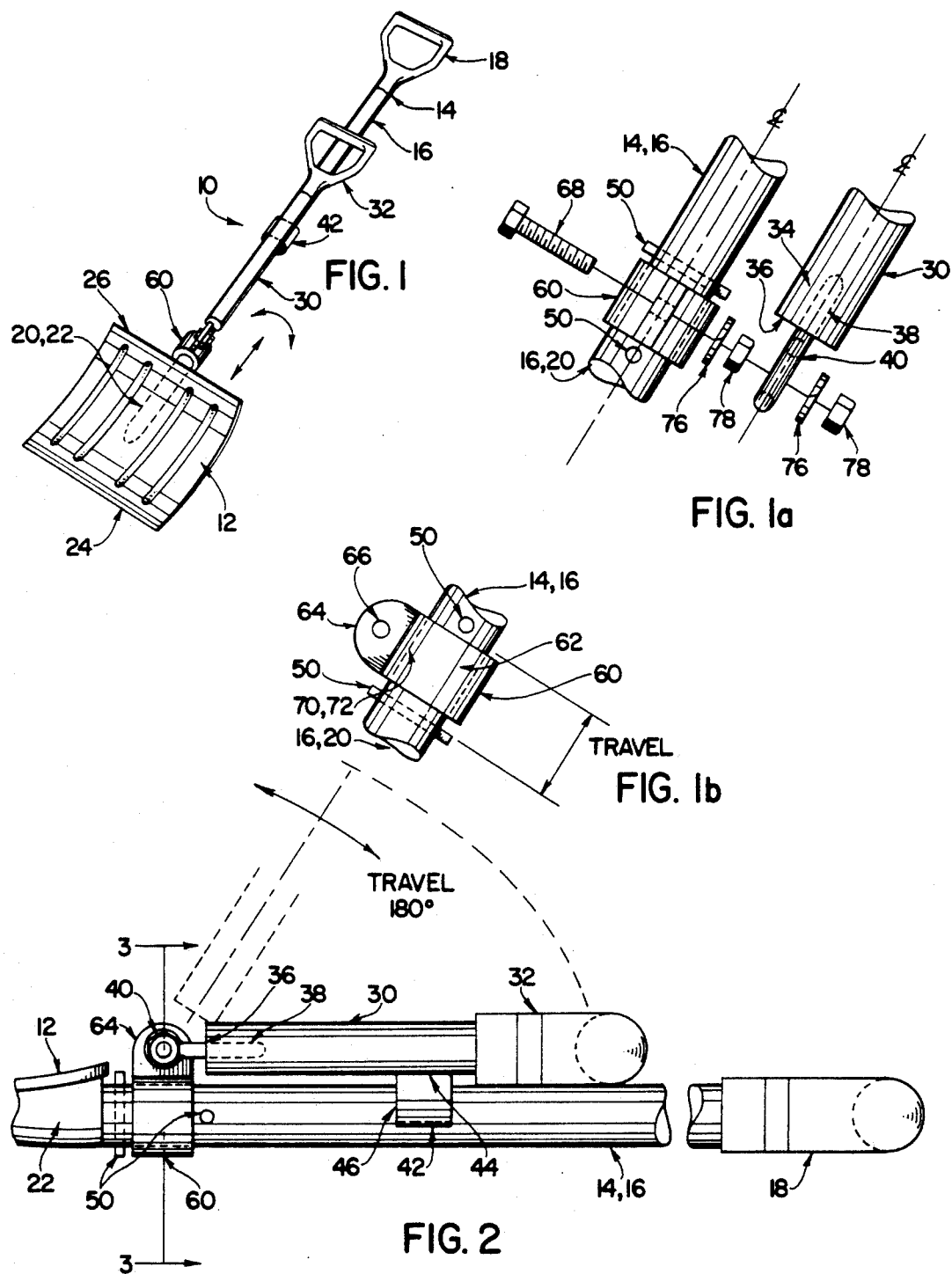

TWO-HANDED SHOVEL

BACKGROUND AND OBJECTS OF THE INVENTION

This invention relates to an improvement in two-handled shovels and particularly snow shovels. The basic concept of two-handed shovels is known and most provide the advantage of decreasing the amount of bending required by the user and, accordingly, the potential strain placed on the user's body including both his or her back and heart. This can also result in less stress on the user's body and thus potentially his or her heart. Two-handed shovels also provide a more favorable position of the left hand which initially does the bulk of the inertial movement and subsequent lifting of the load from its rest position rather than far down on the shaft of a conventional shovel which requires the user to assume an undesirable crouch position.

Examples of such devices proposed in the past include shovel constructions described in the following U.S. patents: U.S. Pat. No. 4,050,728 to Davidson issued Sep. 27, 1977; U.S. Pat. No. 4,264,096 to Barnett issued Apr. 28, 1981; U.S. Pat. No. 4,615,553 issued Oct. 7, 1986 to Hultine; and U.S. Pat. No. 4,944,541 to Waldschmidt issued Jul. 31, 1990. All these devices provide the basic necessary constructional features of two-handled shovel operation, that is, the provision of two handles with one longer than the other and one of which is attached to a scoop or blade and wherein the smaller handle is mounted for at least some pivotal movement within a plane generally normal to the main handle and the blade most commonly attached thereto. While these devices generally accomplish their overall purpose of reducing bending and to some extent user's strain while performing tasks such as snow shoveling and the like, their use is not as comfortable or as flexible in managing various shoveling tasks as is a conventional shovel.

Accordingly, a primary object of the present invention is to present a two-handled shovel of the type above discussed which not only incorporates the features of basic two-handed shovels but additionally operates with a degree of flexibility equal to or greater than normal one-handled shovels.

An additional object of the present invention is to present an improved two-handled shovel construction which enables loads such as scoops of snow to be freely dumped as by the rotational movement of the main handle and blade which is normally associated with such tasks.

A still further object of the present invention is to present a two-handled shovel construction which affords the above-indicated advantages and yet which is easy to use and inexpensive to provide.

These and other objects of the present invention are accomplished by a two-handled shovel comprising a rigid primary handle terminating in a grip at one end and a shovel blade fixedly attached thereto at the opposite second end thereof, connection means mounted on said primary handle proximal to said shovel blade and a rigid secondary handle shorter in length than said primary handle and in turn terminating in a hand grip at one end and attached to said connection means at the opposite second end thereof, said connection means including a bushing longitudinally positioned on said primary handle and having an internal bore adapted to receive said primary handle and permit essentially unlimited rotary movement of said handle with respect to said bushing, said secondary handle second end in turn pivotally connected to said bushing for relative arcuate motion of said second handle towards and away from said primary handle wherein the operator of said shovel may liftingly support a shovel blade load by said secondary handle while simultaneously swinging and rotating said blade via said primary handle to remove said load therefrom.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention:

FIG. 1 is a perspective view of the device of the present invention;

FIG. 1a is an exploded assembly-type top view of a portion of FIG. 1;

FIG. 1b is a partial view of a portion of FIG. 1a rotated 90 degrees;

FIG. 2 is a side elevational view;

DETAILED DESCRIPTION OF THE INVENTION

Figure 3A:
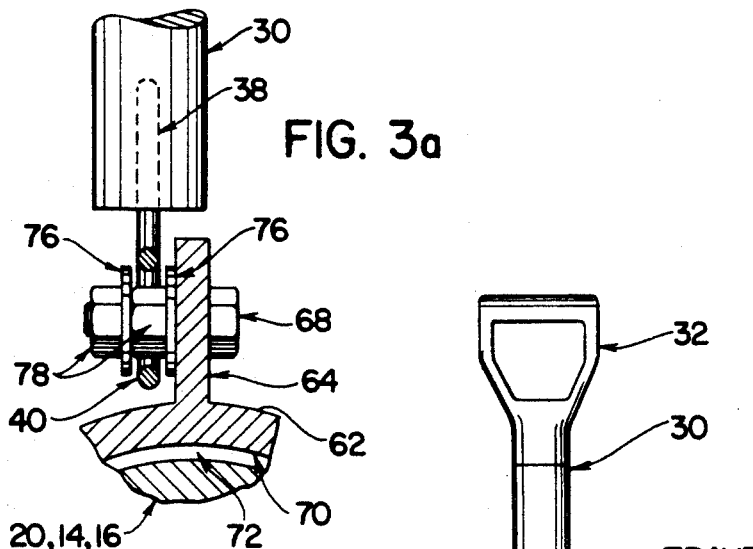
FIG. 3a is an enlarged detail view of a portion of FIG. 3.
Figure 3:
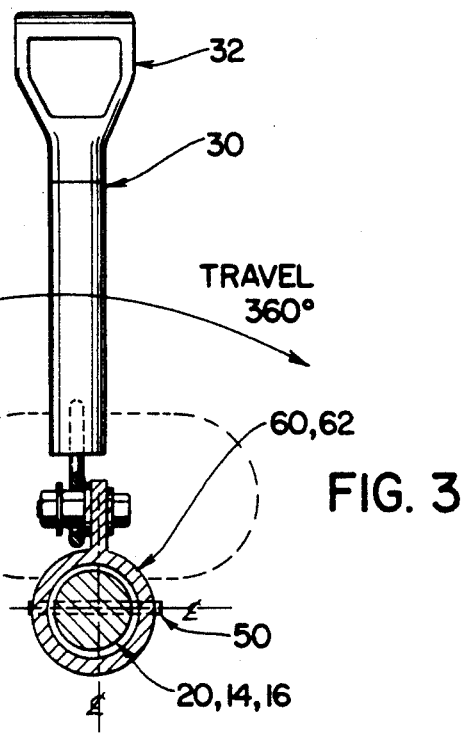
FIG. 3 is an end elevational view partially in section taken along the line 3—3 of FIG. 2.

Referring to the drawings and particularly FIG. 1 thereof, the overall configuration of the shovel device 10 of the present invention is depicted. Therein a blade 12 is shown connected to a primary or drive handle 14. The primary handle 14 includes a shaft 16 which is preferably circular and formed of wood or tubular metal such as aluminum and the like. One end of the handle shaft 16 terminates in a hand grip 18 and the other end in a preferably narrowed or shaped end for disposition into a sleeve 22 mounted on the rear side of the blade.

The blade 12 further includes a lower working edge 24 and an upper opposed edge 26 disposed longitudinally upwardly therefrom. The manner in which the forward end 20 of the shaft 16 is held by the sleeve 22 is conventional and includes nailing, bolting, friction fit, etc. In this regard, it should be pointed out that the resultant fit is permanent, that is, the primary handle 14 and the blade 12 are fixed together for unitary motion.

With particular reference to FIGS. 1a and 2, the manner in which the second handle 30 is attached to the shovel 10 will be most readily evident. In that regard, the secondary or lift handle 30 includes an upper end which terminates in a handle grip 32 and a lower end 34 which terminates in a face 36 in turn provided with a screw 38 which terminates in a round eyelet 40.

A compression saddle 42 having a base portion 44 attached to the secondary handle and a pair of downwardly extending frictional prongs 46 serves to connect the secondary handle to the primary handle when in a rest position or for storage purposes as by the receipt of the shaft 16 between the compression prongs 46. The secondary handle may be formed from any suitable material and may be of any convenient cross-sectional configuration.

The lower portion 20 of the shaft 16 is provided with a bushing 60. The bushing 60 in its simplest form includes an encircling band 62 terminating in upwardly extending lug 64 in turn provided with a hole 66. The hole 66 receives a bolt 68. The band 62 is longitudinally positioned on the shaft 16 by means of a pair of spaced friction pins 50 which preferably allow some play or travel therebetween, e.g., about one quarter inch back and forth. This gives a desirable loose feel to the connection. The bushing 60 interior portions include a bore 70. It should also be pointed out that there is normally a large enough space 72 between the bore 70 and the outside surface of shaft 16 preferably in turn provided with an attached band 62 to enable the free relative rotation of the primary handle 14 with respect to the bushing 60 and thus to the secondary handle 30 to which it is attached via the following mechanism.

Figure 6:
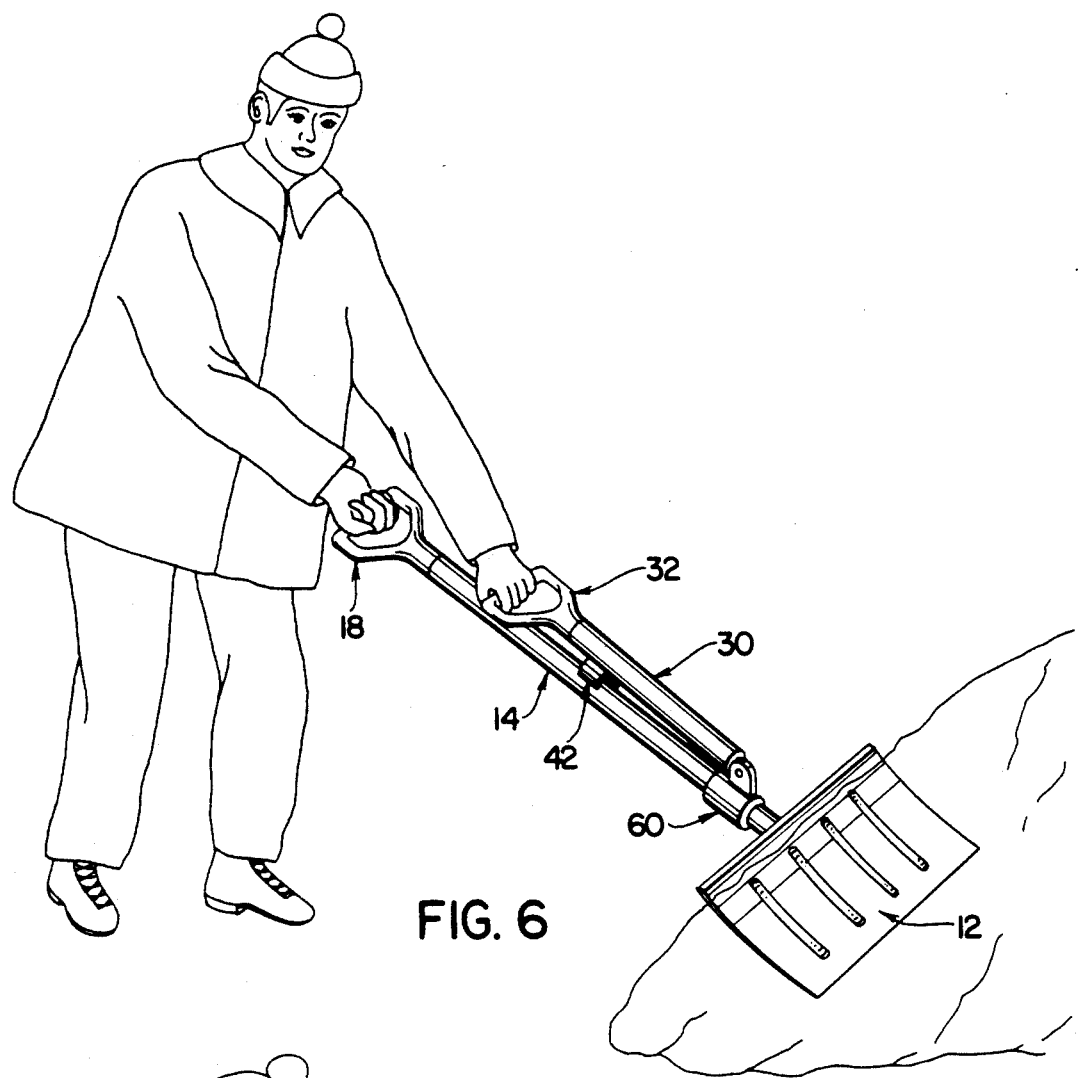
FIGS. 6 and 6a are stylized views showing the manner of use of the device of the present invention.
Figure 6A:
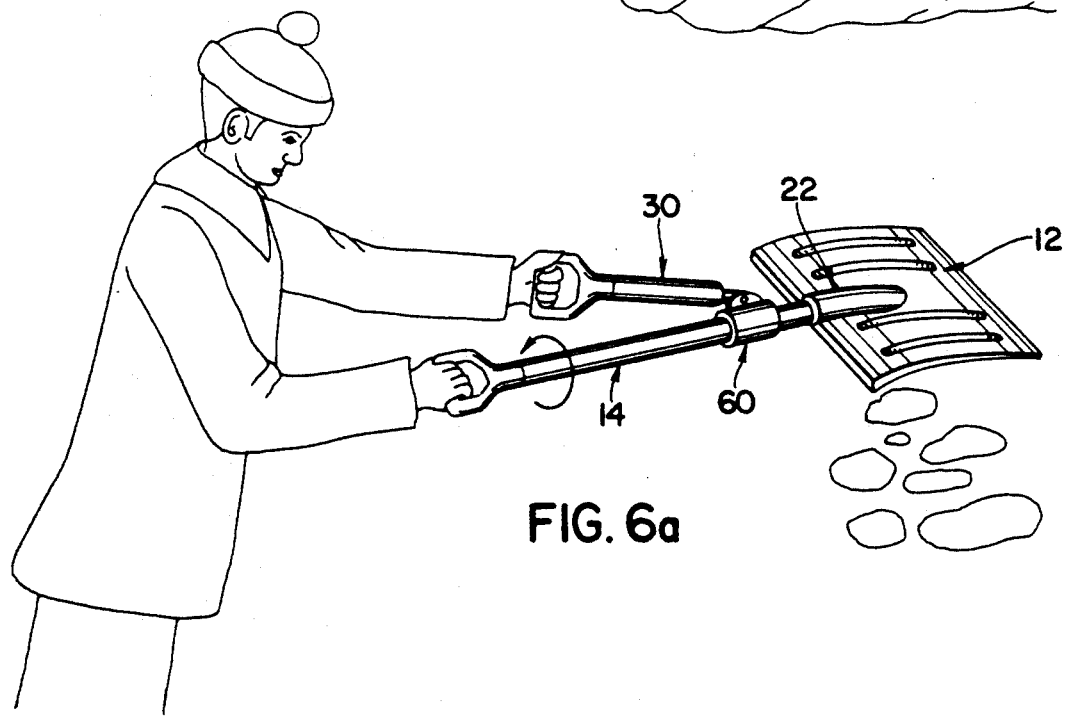

With particular reference to FIG. 1a, the bolt 68 extends beyond the point necessary to provide for fastening itself to the bushing lug 64 and extends through the eyelet 40 of the screw 38. Washers 76 and nuts and/or spacer 78 are provided to assemble the total unit. It may thus be seen that the bolt serves only to mount the secondary handle 30 upon the bushing in the intended fashion and the washers act as retainers of eyelet 40. This fashion is to permit essentially unlimited primary handle rotary movement with respect to the bushing and the secondary handle 30 when the shovel 10 is supported by the secondary handle as by the user's left hand and the primary handle 14 and the blade 12 affixed thereto rotated by the user's right hand. This is the type of action one normally utilizes to shovel a load such as a scoop of snow with a conventional shovel and then proceed to forwardly swing and rotate the handle to, in effect, dump the load in the desired area. These actions are further explained by FIGS. 6 and 6a and the transition therebetween wherein FIG. 6 shows both hands holding the shovel with the right hand doing most of the pushing and the left hand to some extent pushing, if desired, but for the most part sort of resting on the primary handle. This is a natural sort of movement similar to what one would do with a conventional shovel but provides a specific place to not only rest the left hand but to allow it to assist in the pushing action. The compression clamp with the handle 30 in this position engages partially on handle 14 and the thumb ideally extends downward pressed against the handle 14. Of course, the left hand on top as shown in FIG. 6 can be rotated to a more angular position if desired on handle 14 to activate the described use of this hand in a loading mode. Then when a load has been placed on the blade, the shovel is either drawn back or the operator moves forward and then swings the shovel partially across his or her body while supporting such to a great extent with the left arm via the secondary handle and then at the end of such swing dumping the load by rotating the blade via twisting the primary handle by his right hand as further illustrated by the arrow. Such action minimizes work effort when utilizing the present shovel with its additional beneficial features of enabling the left or lifting arm to support a significant portion of the load upon the shovel blade. Such action also enables a more erect body stance to be assumed such that the extended left arm acts as a pendulum when swinging the loaded blade 12. In other words, the best features of conventional shovels and two-handled shovels are incorporated into the present device.

With such construction, it is readily apparent the primary handle and the attached blade are capable of unlimited rotation with respect to the bushing and the second handle in either rotational direction, that is, greater than 360 degree rotation in either direction. It should also be pointed out that while such unlimited rotational movement is desirable or even essential for some aspects of the subject shovel's operation, the above described twist and dump motion may be accomplished by a materially lower degree of permitted rotational movement between the second and first handles. Such is found to be approximately 90 degrees in either direction and is referred to hereinafter by the phrase "essentially unlimited rotary movement". An example of where greater than 360 degree movement in either direction is desirable, is when the shovel blade of the present invention is being utilized on its back face as when cutting snow or chipping ice from stairs or when cutting blocks of snow which then can be picked up as a unit. With such utilization, the shovel would be supported in a vertically downward position by the left hand on handle 30, and the primary handle 14 and blade rotated by the right hand in the desired fashion back and forth to obtain the correct chipping angle and/or the correct sizing of the snow block being defined. In this regard, it should also be pointed out that since the compression clamp is mounted on the secondary handle shaft, that no matter what the rotational position of the secondary and main handles are, the secondary handle can be easily clamped to the main handle shaft in such position as when the user desires a rest and simply does not want to re-orient the shovel.

It should also be pointed out that shovel use examples have been made with reference to normal right-handed use, and obviously the shovel is not so limited and can equally accommodate left hand operation as well.

Figure 5:
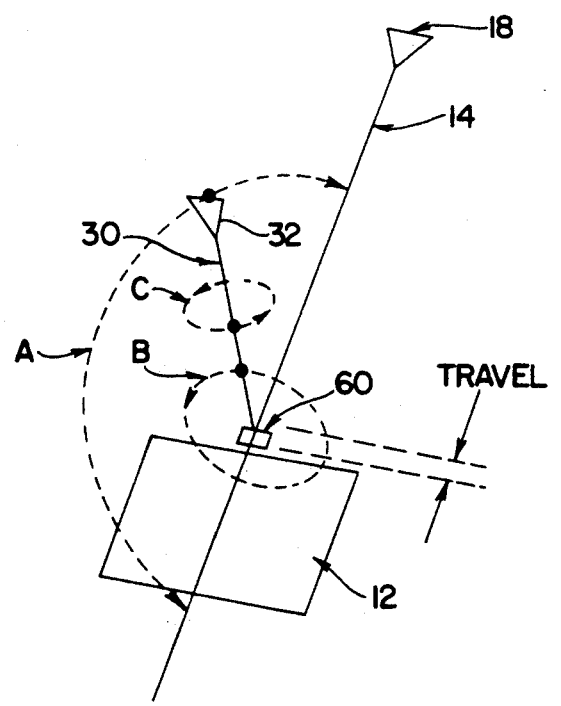
FIG. 5 is a perspective stylized view taken from approximately the same angle as FIG. 1 but showing further the degrees of movement latitude enabled by the device of the present invention.
Figure 4:
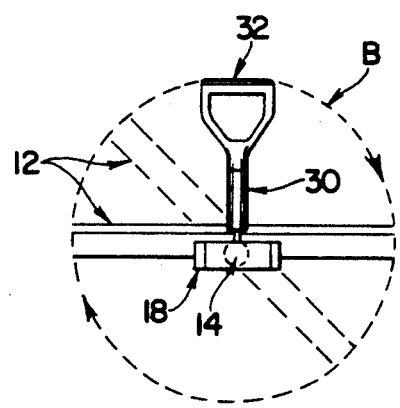
FIG. 4 is a stylized end view similar to FIG. 3 but showing the degree of rotational freedom of the main handle and blade vis-a-vis the supporting secondary handle.

Reference is now made to FIG. 5 wherein the various motions permitted of the shovel components with respect to each other are best shown. Therein reference A refers to the pivotal back and forth motion of the secondary handle 30 with respect to the primary handle 14 in a plane generally perpendicular to the longitudinal axis of the primary handle and its continuation by the blade 12 plane, that is, motion within a plane generally normal to the blade top surface. Such motion is essential for the lift function of two-handled shovels. Additionally with the present invention, essentially unlimited rotary motion of the primary handle 14 with respect to the secondary handle 30 is referred to by the dotted line representation of reference numeral B. Such motion which preferably is greater than 360 degrees in either direction and of unlimited extent is accomplished by the support of the primary handle by the bushing and by the secondary handle in turn to the bushing. The third motion permitted by the device of the present invention which is optional to its essential operation is referred to by reference numeral C. Such circular motion of the secondary handle 30 about primary handle 14 is allowed by the oscillating radial movement of bushing 60 and the loose fit of the eyelet 40. Another loose fit to give some operational play between the two handles in use may be accomplished by longitudinally spacing the positioning pins 50 a slight distance upstream and downstream respectively of the bushing band 62 lateral edges.

While there is shown and described herein certain specific structure embodying this invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A two-handled shovel comprising a rigid primary handle terminating in a grip at one end and a shovel blade fixedly attached thereto at the opposite second end thereof, connection means mounted on said primary handle proximal to said shovel blade and a rigid secondary handle shorter in length than said primary handle and in turn terminating in a hand grip at one end and attached to said connection means at the opposite second end thereof, said connection means including a bushing longitudinally positioned on said primary handle and having an internal bore adapted to receive said primary handle and permit essentially unlimited rotary movement of said primary handle with respect to said bushing, said secondary handle second end in turn pivotally connected to said bushing for relative arcuate motion of said second handle towards and away from said primary handle wherein the operator of said shovel may liftingly support a shovel blade load by said secondary handle while simultaneously swinging and rotating said blade via said primary handle so as to remove said load therefrom.

2. The shovel as set forth in claim 1, wherein said bushing internal bore is circular and said primary handle second end similarly being circular and supportingly received in said bore.

3. The shovel as set forth in claim 1, wherein a pair of longitudinally-spaced pins extend through said primary handle second end on opposite ends of said bushing so as to longitudinally position said bushing vis-a-vis said primary handle.

4. The shovel as set forth in claim 1, said primary handle freely rotatable within said bushing at least 180 degrees.

5. The shovel as set forth in claim 1, said primary handle rotatable within said bushing for unlimited greater than 360 degree movement in either direction.

6. The shovel as set forth in claim 1, said bushing including a body comprising a rotary band terminating in a single upwardly extending lug having a hole through which a bolt transversely extends, said bolt in turn passing through a rotary eyelet outwardly projecting from the second end of said secondary handle so as to pivotally support said secondary handle from said bushing and thus in turn to said primary handle.

7. The shovel as set forth in claim 6, said bushing loosely supported by said primary handle and said secondary handle loosely supported by said bolt.

8. The shovel as set forth in claim 1, said secondary handle including means for temporarily attaching said secondary handle to said primary handle in any rotational orientation of both said handles with respect to each other for storage or rest purposes.

9. The shovel as set forth in claim 8, said temporary attaching means being a compression clamp attached to said secondary handle and adapted to receive said primary handle.

* * * * *